United States Patent
Farzana et al.

(10) Patent No.: US 9,132,616 B2
(45) Date of Patent: Sep. 15, 2015

(54) MULTI-LAYER COMPOSITE MEMBRANE MATERIALS AND METHODS THEREFOR

(75) Inventors: Nusrat Farzana, Lees Summit, MO (US); Vishal Bansal, Overland Park, KS (US)

(73) Assignee: BHA Altair, LLC, Franklin, TN (US)

(*) Notice: Subject to any disclaimer, the term of this patent is extended or adjusted under 35 U.S.C. 154(b) by 478 days.

(21) Appl. No.: 12/872,617

(22) Filed: Aug. 31, 2010

(65) Prior Publication Data

US 2012/0048800 A1    Mar. 1, 2012

(51) Int. Cl.
| | |
|---|---|
| *B01D 69/02* | (2006.01) |
| *B01D 69/12* | (2006.01) |
| *B01D 71/36* | (2006.01) |
| *B32B 37/04* | (2006.01) |
| *B32B 37/02* | (2006.01) |
| *B32B 37/00* | (2006.01) |

(52) U.S. Cl.
CPC ............... *B32B 37/04* (2013.01); *B01D 69/02* (2013.01); *B01D 69/12* (2013.01); *B32B 37/02* (2013.01); *B01D 71/36* (2013.01); *B01D 2323/42* (2013.01); *B01D 2325/02* (2013.01); *B32B 2037/0092* (2013.01); *B32B 2305/026* (2013.01); *B32B 2327/18* (2013.01); *Y10T 156/10* (2015.01)

(58) Field of Classification Search
CPC .. B01D 63/08; B01D 63/081; B01D 67/0027; B01D 69/02; B01D 69/12; B01D 69/122; B01D 71/36; B01D 2323/42; B01D 2325/02; B01D 2325/027; B23B 37/02; B23B 37/04; B23B 2305/026; B23B 2037/0092; B23B 2327/18; Y10T 56/10

USPC ............ 210/500.36, 500.27, 500.21, 321.61, 210/321.75, 321.84
See application file for complete search history.

(56) References Cited

U.S. PATENT DOCUMENTS

| | | | |
|---|---|---|---|
| 4,863,792 A | | 9/1989 | Mrozinski |
| 5,225,131 A | * | 7/1993 | Tamaru et al. ................. 264/113 |
| 5,234,739 A | * | 8/1993 | Tanaru et al. ................. 428/131 |
| 5,500,167 A | * | 3/1996 | Degen ............................. 264/41 |
| 5,571,413 A | | 11/1996 | Mogami et al. |
| 5,834,528 A | * | 11/1998 | Tanaka et al. ................. 521/145 |
| 6,196,708 B1 | * | 3/2001 | Rogers .......................... 362/547 |
| 6,214,093 B1 | * | 4/2001 | Nabata et al. ..................... 96/11 |
| 6,409,785 B1 | | 6/2002 | Smithies et al. |
| 6,736,971 B2 | * | 5/2004 | Sale et al. ................ 210/500.27 |
| 6,808,553 B2 | * | 10/2004 | Kawano et al. ................. 95/287 |
| 7,306,729 B2 | * | 12/2007 | Bacino et al. ............. 210/500.22 |
| 7,387,700 B2 | * | 6/2008 | Tanaka et al. ............. 156/308.2 |
| 8,118,910 B2 | * | 2/2012 | Farzana et al. ................... 95/45 |

(Continued)

FOREIGN PATENT DOCUMENTS

EP         2 174 778 A     1/2009

*Primary Examiner* — David C Mellon
(74) *Attorney, Agent, or Firm* — Reinhart Boerner Van Deuren P.C.

(57) ABSTRACT

Composite membrane materials and process for their production. The process entails the use of at least first and second porous membranes formed of a polymeric material and at least a third porous membrane formed of the same polymeric material, but having larger pores than the first and second porous membranes. The first, second and third porous membranes are laminated together by applying heat and pressure to the first, second and third porous membranes without applying a separate adhesive material therebetween. The laminated first, second and third porous membranes form a composite membrane in which the third porous membrane is between the first and second porous membranes.

14 Claims, 2 Drawing Sheets

(56) References Cited

U.S. PATENT DOCUMENTS

| | | | |
|---|---|---|---|
| 2002/0045041 A1* | 4/2002 | Dillon et al. | 428/311.51 |
| 2006/0157893 A1 | 7/2006 | Patel | |
| 2007/0276477 A1 | 11/2007 | Lee et al. | |
| 2010/0279065 A1* | 11/2010 | Schroer et al. | 428/138 |

* cited by examiner

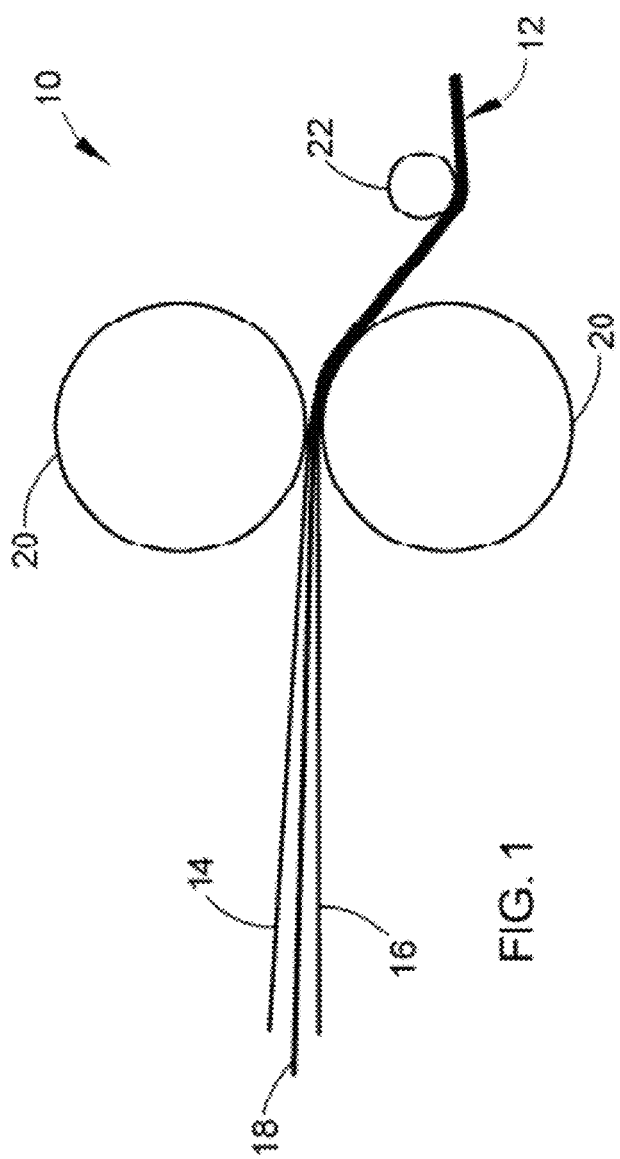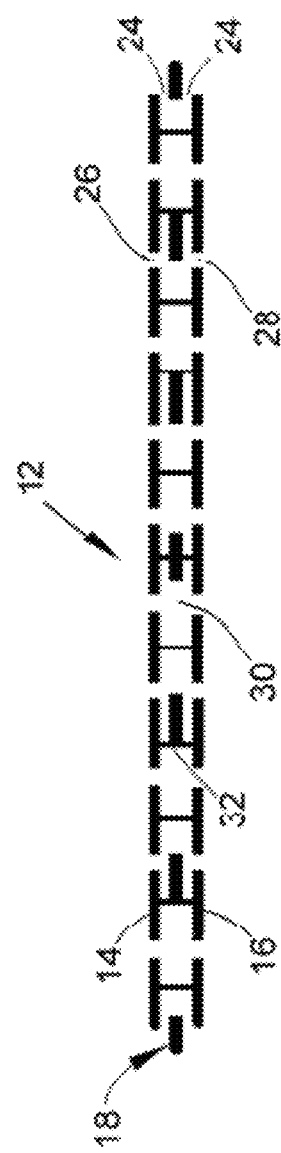

MULTI-LAYER COMPOSITE MEMBRANE MATERIALS AND METHODS THEREFOR

BACKGROUND OF THE INVENTION

The present invention generally relates to composite membrane materials, and more particularly composite membrane materials formed by laminating multiple porous layers while maintaining a desired level of porosity within the composite membrane material.

Porous membranes are employed in a wide variety of applications, nonlimiting examples of which are microventing, liquid filtration, and microfiltration systems, including water filtration systems and filter bag media for dust collectors. Desirable properties of porous membranes will depend on the particular application, though generally controlled porosity, resistance to temperature, chemicals and/or abrasion, and wettability are often of particular interest. Porous membranes have been produced from various materials, including polypropylene, acrylics, polyesters, polyphenylene sulfide (PPS) such as Torcon® and Procon®, aramids such as Nomex®, polyimides such as P84, fiberglass, and polytetrafluoroethylene (PTFE) such as Teflon®. Of these, PTFE and particularly expanded PTFE (ePTFE) membranes have found wide use in view of its chemical resistance and porosity characteristics. The production of ePTFE generally entails extruding a tape formed of PTFE, and then subjecting the tape to biaxial stretching in the plane of the tape to produce a membrane containing pores, often micropores, i.e., pore sizes of less than one micrometer. Because PTFE is hydrophobic, treatment is required to allow the use of PTFE membranes for filtration applications in which water or a water-containing liquid is to be filtered. Various treatment techniques are well know for imparting hydrophobic, oleophobic and hydrophilic properties to PTFE membranes.

For certain applications, composite ePTFE membranes are constructed of two or more microporous ePTFE membranes that are laminated together with the assistance of a bonding agent. Suitable bonding agents are typically formed of polymeric materials having lower melting temperatures than PTFE to allow the bonding materials to melt and bond the PTFE membranes together without melting or otherwise damaging the membranes. The bonding agent may be applied in liquid form or as an adhesive web or film that is melted during the lamination process. However, the presence of the bonding agent between PTFE membranes inevitably reduces porosity of the composite membrane, particularly if the membranes are microporous.

In view of the above, it would be desirable if alternative methods were available by which membranes, and particularly microporous membranes formed of ePTFE, could be bonded together to form composite membrane materials.

BRIEF DESCRIPTION OF THE INVENTION

The present invention provides composite membranes and processes for their production. The composite membranes can be processed to be suitable for use in a wide variety of applications, including but not limited to microventing, liquid filtration, and microfiltration systems and processes.

According to a first aspect of the invention, a process is provided for producing a composite membrane that entails the use of at least first and second porous membranes formed of a polymeric material and at least a third porous membrane formed of the same polymeric material, but having larger pores than the first and second porous membranes. The first, second and third porous membranes are laminated together by applying heat and pressure to the first, second and third porous membranes without applying a separate adhesive material therebetween. The laminated first, second and third porous membranes form a composite membrane in which the third porous membrane is between the first and second porous membranes.

Another aspect of the invention is a composite membrane produced by the process described above. According to a particular aspect of the invention, the composite membrane comprises at least first and second porous membranes formed of a polymeric material, and at least a third porous membrane between and bonded to the first and second porous membranes without a separate adhesive material therebetween. The third porous membrane is formed of the same polymeric material as the first and second porous membranes, but has larger pores than the first and second porous membranes. Furthermore, the first and second porous membranes are bonded to each other by resolidified portions thereof that extend through the third porous membrane. In a particular but nonlimiting example, the polymeric material is polytetrafluoroethylene and the first, second and third porous membranes are expanded polytetrafluoroethylene membranes.

In view of the above, it can be seen that a technical effect of this invention is that a composite membrane can be fabricated to contain multiple membrane layers formed of the same polymeric material, which are bonded together without the inclusion of any type of extraneous adhesive material. Consequently, an extraneous bonding agent is not presence between the individual membranes that would reduce the porosity of the composite membrane.

Other aspects and advantages of this invention will be better appreciated from the following detailed description.

BRIEF DESCRIPTION OF THE DRAWINGS

FIG. 1 schematically represents a process and apparatus for forming a porous composite membrane material comprising individual porous membranes in accordance with an embodiment of this invention.

FIG. 2 schematically represents a cross-sectional view of a composite membrane material of a type that can be produced by the process of FIG. 1.

DETAILED DESCRIPTION OF THE INVENTION

FIG. 1 schematically represents an apparatus 10 for carrying out a process for producing a porous composite membrane material 12 formed of multiple individual porous membranes 14, 16 and 18. An example of the porous composite membrane material 12 is schematically represented in FIG. 2, with the layers of the composite membrane material 12 shown spaced apart to facilitate an understanding of differences between the individual porous membranes 14, 16 and 18. Therefore, it should be understood that FIG. 2 is drawn for the purpose of explaining the invention and is not to scale. Furthermore, though the composite membrane material 12 is represented in FIGS. 1 and 2 as being formed by three individual membranes 14, 16 and 18, the membrane material 12 could comprise more than three individual membranes 14, 16 and 18.

Figure 3:
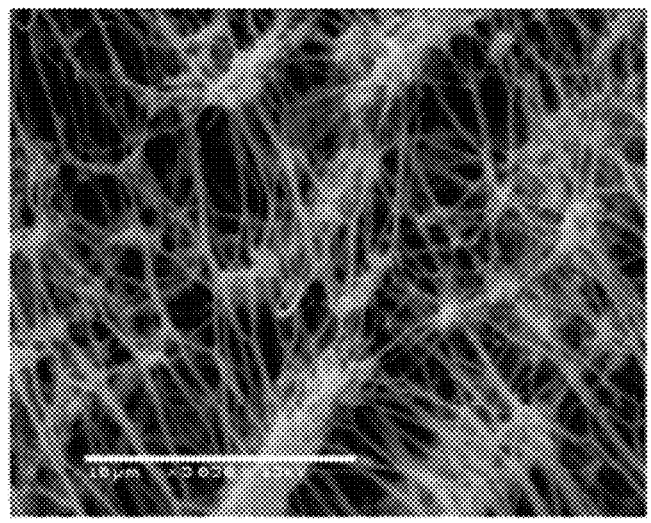
FIG. 3 is a microphotograph of an exemplary membrane that can be used as an intermediate membrane of the composite membrane material represented in FIG. 2.
Figure 4:
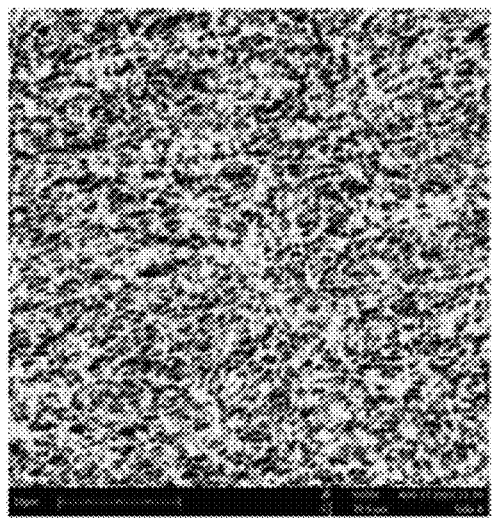
FIGS. 4 and 5 are microphotographs of exemplary membranes that can be used as outer membranes of the composite membrane material represented in FIG. 2.
Figure 5:
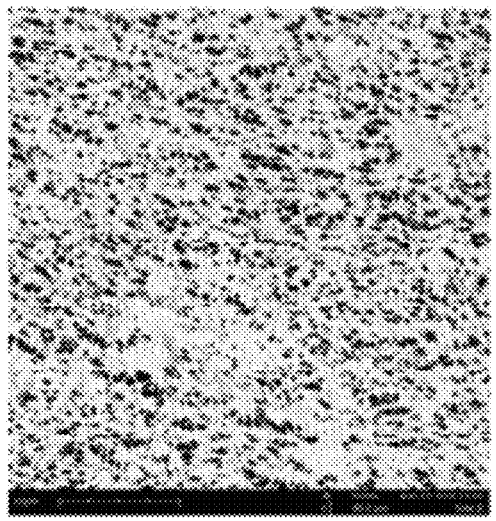

The composite membrane material 12 is intended to be porous and permeable so that a sufficiently small substance, such as a particulate solid (for example, particles) or molecules of a fluid (including gases, vapors and liquids) can pass or flow through the membrane material 12, whereas larger solids and molecules are unable to pass through the membrane material 12. As such, the individual membranes 14, 16 and 18 are also porous and permeable as a result of containing numerous pores 26, 28 and 30 (FIG. 2), respectively, that extend entirely through the membranes 14, 16 and 18. Such porosity can be created by performing a variety of processes, including but not limited to perforation, stretching, expansion, bubbling, and extraction processes on nonporous sheet materials. Suitable sheet materials can be formed by a variety of processes, including but not limited to extrusion, foaming, skiving and casting. Such processes are well known, and will not be discussed in any detail here. A preferred process for producing the membranes 14, 16 and 18 is believed to be extrusion of a tape, followed by biaxial stretching (also known as tentering) to create a desired level of porosity in the membranes 14, 16 and 18. Tentering of tapes to produce porous membranes are also well known, and therefore will not be discussed here in any detail. FIG. 3 is a microphotograph of an example of the membrane 18 and FIGS. 4 and 5 are microphotographs of examples of membranes 14 and 16 that were produced by tentering during investigations leading to the present invention.

The individual membranes 14, 16 and 18 can be formed from various materials. However, a preferred aspect of the invention is that all three membranes 14, 16 and 18 are formed of the same polymeric material. While various candidate materials are well known, including but not limited to polypropylene, acrylics, polyesters, polyphenylene sulfide (PPS), aramids, polyimides, and fiberglass, a preferred material for the membranes 14, 16 and 18 is polytetrafluoroethylene (PTFE), whose expansion yields what is known as expanded PTFE (ePTFE). Notable examples of PTFE include the Teflon® family of resins commercially available from E. I. du Pont de Nemours & Company. It is foreseeable that the membranes 14, 16 and 18 could be formed to contain one or more additives to modify certain properties, for example, antimicrobial, abrasion resistance, tensile strength, etc., resulting in properties for the composite membrane material 12 being enhanced while retaining the base composition of each membrane 14, 16 and 18.

For the production of the ePTFE membranes 14, 16 and 18, a suitable but nonlimiting process is to mix a PTFE resin with a lubricating agent, forming the mixture into billets, extruding the billets to form tapes, which may undergo calendering to promote the uniformity of the tapes prior to being biaxially stretched to form the membranes 14, 16 and 18. During the expansion process, the tapes are stretched (strained) beyond the elastic limit of their material to introduce a permanent set or elongation, resulting in each membrane 14, 16 and 18 generally having a macrostructure (architecture) comprising a three-dimensional matrix or lattice-type structure in which individual fibrils are interconnected by nodes, with irregular-shaped interconnected pores 26, 28 or 30 defined therebetween. The typical size of the pores 26, 28 and 30 will dependent on the physical and chemical properties of the membrane material and the parameters of the expansion process, though pore sizes of up to about 20 micrometers are readily achievable for ePTFE membranes, with pore sizes of less than ten micrometers being more typical, and pore sizes of less than five micrometers being typical for microfiltration and nano-filtration processes. Thereafter, the membranes 14, 16 and 18 may undergo sintering at temperatures below their melting temperatures for durations that are capable of reducing stresses (anneal) and stabilizing their microstructures. As noted above, all of these processes are well known in the art and therefore will not be discussed in any further detail. The final thicknesses of the membranes 14, 16 and 18 can and will vary depending on the particular intended application for the composite membrane material 12. For applications in which microporosity of the membrane material 12 is desired, typical thicknesses for the individual membranes 14, 16 and 18 may be in a range of about 2.5 to about 250 micrometers, and typical thicknesses for the resulting composite membrane material 12 may be in a range of up to about 0.5 millimeters. Furthermore, porosity levels of about 1% to about 97% are typically desirable for applications in which microporosity of the membrane material 12 is desired, though lesser and greater porosity levels are foreseeable.

According to a preferred aspect of the invention, the composite membrane material 12 is produced without the use of any extraneous adhesive material being used to bond the membranes 14, 16 and 18 together. Instead, as schematically represented in FIG. 2 and evident from comparing FIGS. 3, 4 and 5, the intermediate membrane 18 is produced to have larger pores 30 than the two outer membranes 14 and 16, and is then used to directly bond the membranes 14 and 16 to each other without any intervening substance within the interface or interstitial regions 24 therebetween (FIG. 2), in other words, with no substantial amount or only a trace amount of an additional substance that is different from the material of the membranes 14, 16 and 18 and capable of bonding the membranes 14, 16 and 18 together. Consequently, a composite membrane material 12 formed of ePTFE membranes 14, 16 and 18 can consist essentially or entirely of PTFE.

Bonding is preferably achieved through a thermal lamination process or some other type of process during which the membranes 14, 16 and 18 are subjected to pressure and heated to the extent that incipient melting occurs, resulting in the membranes 14, 16 and 18 being bonded together after cooling with only the material of the membranes 14, 16 and 18. Such a process is schematically represented in FIG. 1, which shows the membranes 14, 16 and 18 passing between two heated rollers 20, and then subsequently around a winder 22. While FIG. 1 represents all three membranes 14, 16 and 18 as being simultaneously laminated together, the invention also encompasses other lamination techniques. As an example, the intermediate membrane 18 can be initially laminated to only one of the membranes 14 or 16, after which a second lamination step is performed in which the remaining membrane 14 or 16 is laminated to the surface of the resulting lamination defined by the intermediate membrane 18. The second lamination step can be performed immediately after the first lamination step as part of a continuous lamination process, or can be performed later as part of an entirely separate lamination process. In certain embodiments of the invention, the membranes 14 and 16 may be identical or otherwise interchangeable within the composite membrane material 12, such that the lamination order is not critical.

The pressure applied by the lamination rollers 20 (as well as any additional rollers that may be used to apply pressure during a subsequent lamination step) should be sufficient to achieve intimate contact between the membranes 14, 16 and 18 that will result in bonding at the elevated temperature. In lamination processes of the type represented in FIG. 1, the membranes 14, 16 and 18 are preferably heated to a temperature slightly below, for example, within 20° C. of, the melting temperature of the material of the membranes 14, 16 and 18. In the case where the membranes 14, 16 and 18 are formed of PTFE (melting point of 341° C. to about 348° C.), the membranes 14 and 16 and 18 are preferably heated to a temperature of about 332° C. to about 340° C., for example, about 336° C.

The larger pore size of the intermediate membrane 18 is believed to be important in order to maintain the porosity of the other membranes 14 and 16 and, consequently, the desired porosity of the composite membrane material 12. In particular, attempts to directly laminate ePTFE membranes (such as membranes 14 and 16) having pore sizes and porosities desired for a composite membrane material have required the use of temperatures and/or pressures that produce composite membrane materials that may be essentially impermeable as a result of pore blockage, for example, due to pore distribution and/or damage to the surfaces of the membranes. In contrast, bonding of identical membranes 14 and 16 with a membrane 18 of the same material but having larger pores 30 has been surprisingly shown to achieve acceptable bonding at temperatures and pressures that cause very little and often negligible pore blockage. The membrane 18 can have an average pore size of at least five times greater (as schematically represented in FIG. 2), more preferably about ten times greater, than the membranes 14 and 16. Notably, by combining the three (or more) membranes 14, 16 and 18, the resulting composite membrane material 12 has an effective pore size of less than the individual membranes 14, 16 and 18 as a result of the pores of the overlapping layers not being aligned with each other. For example, laminating membranes 14 and 16 with pore sizes exceeding one micrometer with a membrane 18 having a pore size of five times or more greater can produce a composite membrane material 12 that exhibits an air permeability that is lower than a single sheet membrane having a pore size of about 0.05 micrometer. For example, membranes 14 and 16 having pore sizes of about one micrometer have produced composite membrane materials 12 that have air permeabilities of about 10 liters/$m^2$s, which is comparable to prior art single sheet membranes having a pore size of about 0.05 micrometer. Air permeabilities of less than 10 liters/$m^2$s, for example, about 5 liters/$m^2$s, have also been produced. These composite membrane materials 12 also exhibited desirable characteristics as quantified by oil rating (AATCC Test Method 118-1983), bubble point pressure (ASTM F316), and water entry pressure or WEP (ASTM D751). These composite membrane materials 12 had oil ratings of #7 or #8, isopropyl alcohol (IPA) bubble point pressures of greater than 40 psi to about 47 psi (about 2.8 to about 3.2 bar), and WEP levels of about 120 to about 180 psi (about 8.3 to about 12.4 bar). The multilayer construction of the membrane materials 12 was concluded to have promoted these performance factors, which are extremely important for various membrane applications.

The larger pore size of the membrane 18 can be achieved during the expansion process by subjecting its precursor tape to greater expansion than the tapes used to produce the membranes 14 and 16. The resulting membranes 14 and 16 may be essentially identical, and tend to be more amorphous (less crystalline) than the membrane 18 as a result of the greater extent to which the membrane 18 is expanded. Consequently, portions of the membranes 14 and 16 are able to start melting prior to any melting of the membrane 18. These molten portions of the membranes 14 and 16 flow into and may flow through the pores of the membrane 18, preferably to the extent that the molten portions are able to commingle or merge together within the pores of the membrane 18. Upon resolidification of their molten portions, the membranes 14 and 16 are bonded to the membrane 18 and preferably bonded to each other by the resolidified portions 32, forming a strong bond created by an interlocking network of resolidified portions 32 that preferably extends entirely through the thickness of the membrane 18, as schematically represented in FIG. 2. As such, bonding of the membranes 14, 16 and 18 entails incipient melting of the membranes 14 and 16, and does not require melting of the membrane 18 during the lamination process. In some cases no melting of the membrane 18 will occur.

Prior to or after the lamination process, the membranes 14, 16 and 18 and/or the resulting composite membrane material 12 can undergo various treatments, for example, a treatment that will render a composite membrane material 12 formed of ePTFE membranes 14, 16 and 18 to be hydrophilic and/or oleophobic. Such treatments are well known, nonlimiting examples of which include impregnation using a tetrafluoroethylene/vinyl alcohol copolymer, coating the membrane interior with a mixture of a fluoroaliphatic surfactant and a hydrophilic but water-insoluble polyurethane, irradiation treatment, treatment with a hydrophilic precursor acrylate terpolymer, etc. Notably, the individual membranes 14, 16 and 18 can have sufficiently large pore sizes (for example, about 0.1 micrometer or more) to promote penetration of the treatment, yet yield a membrane material 12 whose effective pore size might otherwise limit penetration.

Following or as a result of the lamination process, the composite membrane material 12 may be bonded to one or more additional layers that form a substrate or backer media for the material 12, for example, as a structural element for use in microfiltration applications. Substrate and backer media are well known in the art, with nonlimiting examples including one or more layers of polyester, polypropylene, polyamide, polyethylene, polyphenylene sulfide (PPS), and nonexpanded PTFE. The substrate or backer media can have a variety of architectures, examples of which include woven, scrim, nonwoven and felt.

Composite membrane materials 12 produced in the manner described above can find use in a wide variety of applications, with their suitability being larger dependent on the material and pore sizes of the membranes 14, 16 and 18 and the effective pore size and porosity of the material 12. Nonlimiting examples include microventing, microfiltration, liquid filtration (including water purification) and hot gas filtration processes performed in medical, industrial, power generation, and automotive applications. Particular examples include the decontamination of chemical and/or biological agents. Composite membrane materials formed of ePTFE are particularly well suited for medical applications in which gamma radiation stability, sterilization including EtO (ethylene oxide) gas sterilization, etc., are notable requirements.

While the invention has been described in terms of preferred embodiments, it is apparent that other forms could be adopted by one skilled in the art. Therefore, the scope of the invention is to be limited only by the following claims.

The invention claimed is:

1. A process for producing a composite membrane material, the process comprising:
processing a polymeric material to produce at least first and second porous membranes formed of the polymeric material, each of the first and second porous membranes comprising pores;
providing at least a third porous membrane formed of the polymeric material, the third porous membrane having pores that have an average pore size greater than average pore sizes of the pores of each of the first and second porous membranes, and wherein the first and second porous membranes are more amorphous and less crystalline than the third porous membrane;

without applying a separate adhesive material therebetween, laminating the first, second and third porous membranes together by applying heat and pressure to the first, second and third porous membranes to cause incipient melting of at least the first and second porous membranes, wherein during the laminating step the first and second porous membranes start to melt prior to any melting of the third porous membrane;

and then cooling the first, second and third porous membranes to cause the first and second porous membranes to bond to each other by resolidified portions thereof that extend through the third porous membrane, the first, second and third porous membranes being laminated together to form a composite membrane material wherein the third porous membrane is between the first and second porous membranes, the composite membrane material having an effective pore size of less than the average pores sizes of each of the first, second and third porous membranes.

2. The process according to claim 1, wherein the laminating step comprises simultaneously laminating the first, second and third porous membranes together.

3. The process according to claim 1, wherein the laminating step comprises laminating the first and third porous membranes together, and then laminating the second porous membrane to the third porous membrane.

4. The process according to claim 1, wherein the processing that produces the first and second porous membranes comprises expansion of nonporous sheets formed of the polymeric material, and the average pore size of the third porous membrane is produced by subjecting the third porous membrane to greater expansion than the first and second porous membranes.

5. The process according to claim 4, wherein the expansion of the first, second and third porous membranes causes the first and second porous membranes to be more amorphous and less crystalline than the third porous membrane.

6. The process according to claim 1, wherein the average pore size of the third porous membrane is least five times greater than the average pore sizes of the pores of each of the first and second porous membranes.

7. The process according to claim 1, further comprising bonding the composite membrane material to a substrate that structurally supports the composite membrane material.

8. The process according to claim 1, wherein the polymeric material is polytetrafluoroethylene.

9. The process according to claim 8, wherein the first, second and third porous membranes are expanded polytetrafluoroethylene membranes, and the process further comprises forming the first, second and third porous membranes by biaxially stretching polytetrafluoroethylene sheets.

10. The process according to claim 8, further comprising treating the first, second and third porous membranes to be hydrophilic and/or oleophobic prior to the laminating step or treating the composite membrane material to be hydrophilic and/or oleophobic after the laminating step.

11. The process according to claim 8, wherein the laminating step comprises heating the first, second and third porous membranes to a temperature below the melting temperature of polytetrafluoroethylene but sufficiently high to cause incipient melting of the first and second porous membranes.

12. The process according to claim 11, wherein the biaxially stretching of the first, second and third porous membranes causes the first and second porous membranes to be more amorphous and less crystalline than the third porous membrane.

13. The process according to claim 11, wherein the average pore size of the third porous membrane is least five times greater than the average pore sizes of the pores of each of the first and second porous membranes.

14. The process according to claim 8, further comprising using the composite membrane material in a step chosen from the group consisting of microventing, microfiltration, and liquid filtration.

* * * * *